(12) United States Patent
Dachs et al.

(10) Patent No.: US 9,914,257 B2
(45) Date of Patent: Mar. 13, 2018

(54) APPARATUS AND METHOD FOR TRANSFORMING PLASTIC PARISONS INTO PLASTIC CONTAINERS WITH AIR DISCHARGE

(71) Applicant: KRONES AG, Neutraubling (DE)

(72) Inventors: Alexander Dachs, Regensburg (DE); Gerald Huettner, Vilseck (DE); Heinrich Deyerl, Teunz (DE); Jochen Forsthoevel, Regensburg (DE); Peter Grassl, Nittenau (DE); Ulrich Lappe, Neutraubling (DE)

(73) Assignee: Krones AG (DE)

( * ) Notice: Subject to any disclaimer, the term of this patent is extended or adjusted under 35 U.S.C. 154(b) by 213 days.

(21) Appl. No.: 14/459,555

(22) Filed: Aug. 14, 2014

(65) Prior Publication Data

US 2015/0061196 A1 Mar. 5, 2015

(30) Foreign Application Priority Data

Sep. 5, 2013 (DE) .......................... 10 2013 109 716

(51) Int. Cl.
*B29C 49/48* (2006.01)
*B29C 49/62* (2006.01)
(Continued)

(52) U.S. Cl.
CPC .............. *B29C 49/62* (2013.01); *B29C 49/48* (2013.01); *B29C 49/06* (2013.01); *B29C 49/08* (2013.01);
(Continued)

(58) Field of Classification Search
CPC .............. B29C 49/62; B29C 2049/627; B29C 2049/4892
See application file for complete search history.

(56) References Cited

U.S. PATENT DOCUMENTS 3,474,498 A * 10/1969 Hoppes .................. B29C 49/52
249/103
3,499,071 A 3/1970 Hurst
(Continued)

FOREIGN PATENT DOCUMENTS

AT 284010 8/1970
CH 472952 5/1969
(Continued)

OTHER PUBLICATIONS

Rosato et al (editors), Blow Molding Handbook, Oxford University Press, pp. 282-288.*
(Continued)

*Primary Examiner* — Robert B Davis
(74) *Attorney, Agent, or Firm* — Onello & Mello, LLP

(57) ABSTRACT

A blow mould for producing plastic containers comprises at least two blow mould parts and a hollow space formed from the at least two blow mould parts at which plastic parisons are transformed by an application of a flowable medium to the plastic containers. The hollow space includes an interior wall that has a contour which produces a predetermined configuration of the plastic containers. A first portion of at least two blow mould parts produces a bottom of the plastic containers. A second portion of the at least two blow mould parts has an opening region for discharging a gaseous medium during an expansion process of the plastic containers. The opening region extends along a first line and a second line, wherein the first and second lines run at least in some sections of the blow mould at an angle different from 0° relative to one another.

20 Claims, 9 Drawing Sheets

(51) Int. Cl.
  *B29K 105/00* (2006.01)
  *B29L 31/00* (2006.01)
  *B29C 49/06* (2006.01)
  *B29C 49/08* (2006.01)
(52) U.S. Cl.
  CPC ...... *B29C 2049/4892* (2013.01); *B29C 2049/627* (2013.01); *B29C 2791/006* (2013.01); *B29C 2791/007* (2013.01); *B29K 2105/258* (2013.01); *B29L 2031/7158* (2013.01)

(56) References Cited

U.S. PATENT DOCUMENTS

| | | | | |
|---|---|---|---|---|
| 4,120,924 | A * | 10/1978 | Rainville | B29C 49/0005 264/40.3 |
| 4,865,206 | A * | 9/1989 | Behm | B65D 1/0284 215/375 |
| 5,217,729 | A * | 6/1993 | Terauchi | B29C 33/10 249/135 |
| 5,921,416 | A | 7/1999 | Uehara | |
| 7,267,537 | B2 * | 9/2007 | Mitchell | B29C 49/56 425/182 |
| 8,770,232 | B2 * | 7/2014 | Onodera | B29C 49/52 138/121 |
| 8,936,458 | B2 | 1/2015 | Senn et al. | |
| 2006/0134257 | A1 * | 6/2006 | Krumbock | B29C 47/0023 425/326.1 |
| 2011/0037187 | A1 * | 2/2011 | Winzinger | B29C 49/42 264/39 |
| 2012/0080827 | A1 | 4/2012 | Senn et al. | |
| 2016/0332356 | A1 * | 11/2016 | Langlois | B29C 49/06 |

FOREIGN PATENT DOCUMENTS

| | | |
|---|---|---|
| CN | 102441981 | 5/2012 |
| DE | 2039036 | 2/1972 |
| DE | 68907447 | 2/1994 |
| DE | 29908024 | 7/1999 |
| DE | 10103787 | 8/2002 |
| DE | 102007050692 | 4/2009 |
| DE | 102010032618 | 2/2012 |
| JP | 10-272680 A | 10/1998 |
| JP | 2000167918 | 6/2000 |
| WO | WO 2015092213 A1 * | 6/2015 ............ B29C 49/48 |

OTHER PUBLICATIONS

German Search Report dated Mar. 25, 2014 in corresponding German Application No. 10 2013 109 716.2.
China Office Action dated Apr. 27, 2016, issued in Corresponding China Patent Application No. 201410403909.1.
2nd Chinese Office Action dated Sep. 30, 2016 issued in corresponding China Application No. 2014104039091 and English language translation.

* cited by examiner

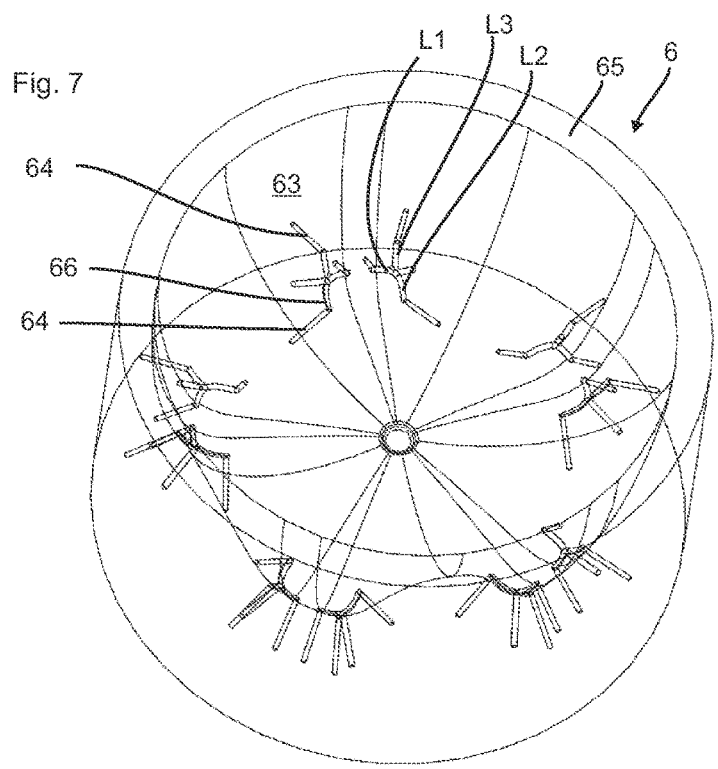
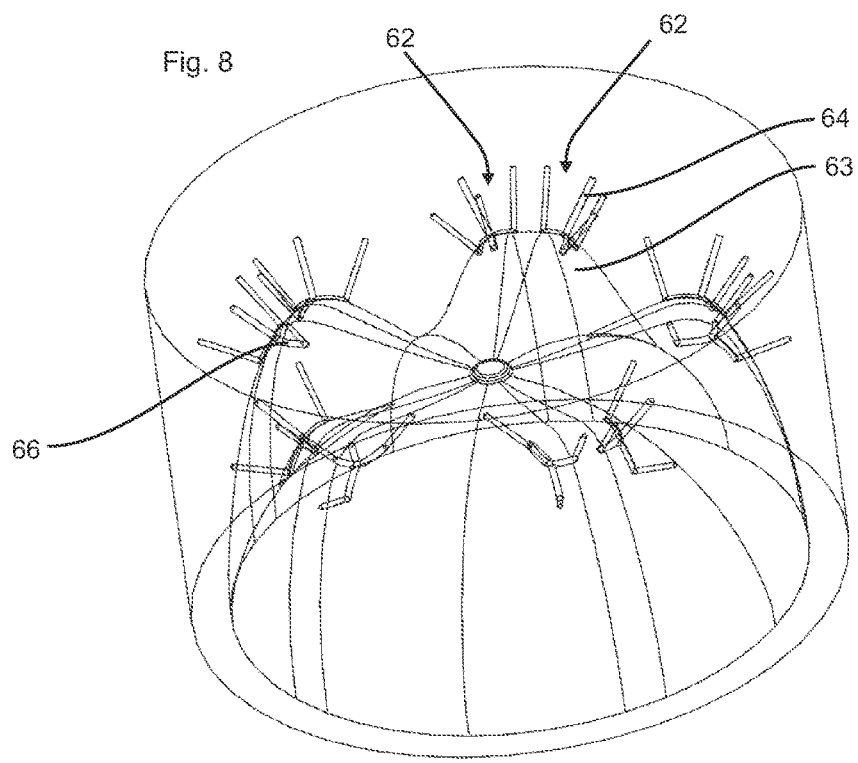

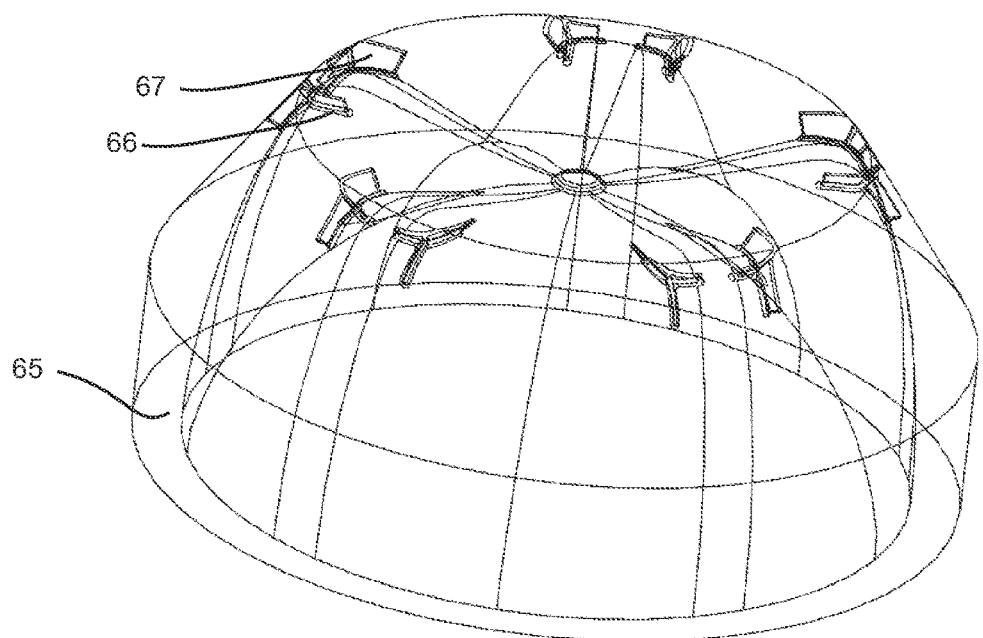
Fig. 9
Fig. 10
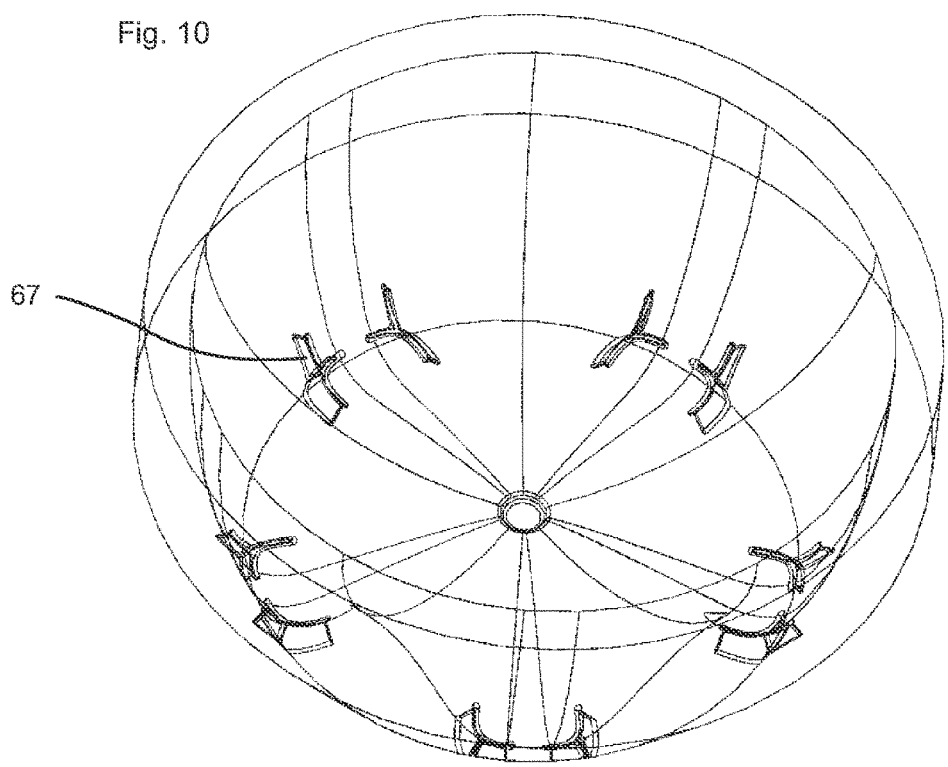

65
67

L1  L2

APPARATUS AND METHOD FOR TRANSFORMING PLASTIC PARISONS INTO PLASTIC CONTAINERS WITH AIR DISCHARGE

CROSS-REFERENCE TO RELATED APPLICATIONS

A claim for priority under 35 U.S.C. § 119 is made to German Patent Application No. 10 2013 109 716.2 filed Sep. 5, 2013, in at the German Intellectual Property Office, the entire contents of which are hereby incorporated by reference.

FIELD

The present inventive concepts relate to a blow mould, a blow moulding machine, and a method for transforming plastic parisons into plastic containers.

BACKGROUND

Heated plastic parisons are typically introduced into a blow mould, which forms a hollow space which serves for expansion of the plastic parisons to form plastic containers. Within this hollow space, the plastic parisons are usually supplied with blown air against an inner wall of the blow mould parts. The inner wall has a contour of the plastic containers to be produced.

SUMMARY

In one aspect, a blow mould for producing plastic containers comprises at least two blow mould parts; a hollow space formed from the at least two blow mould parts at which plastic parisons are transformed by an application of a flowable medium to the plastic containers; the hollow space including an interior wall that has a contour which produces a predetermined configuration of the plastic containers; a first portion of at least two blow mould parts producing a bottom of the plastic containers; and a second portion of the at least two blow mould parts having an opening region for discharging a gaseous medium during an expansion process of the plastic containers, wherein the opening region extends along a first line and a second line, wherein the first and second lines run at least in some sections of the blow mould at an angle different from 0° relative to one another.

In some embodiments, the opening region is disposed in a region of the blow mould, which forms a supporting foot of the plastic containers.

In some embodiments, the opening region is constructed and arranged as a slot.

In some embodiments, a plurality of holes are disposed in the opening region, and along at least one of the first and second lines.

In some embodiments, at least one hole of the plurality of holes has a diameter between 0.5 mm and 4 mm.

In some embodiments, at least one hole of the plurality of holes has a diameter between 0.5 mm and 2 mm.

In some embodiments, a spacing between two adjacent holes along at least one of the first and second lines is less than 2 mm.

In some embodiments, the at least two blow mould parts further comprise a wall and a plurality of channels which discharge the gaseous medium, and adjoin the opening regions at the wall.

In some embodiments, the channels extend at least in some sections along a surface normal to a contour of the hollow space.

In some embodiments, a blow mould part of the at least two blow mould parts has a forming portion for forming a base surface of the plastic containers, and wherein the opening region is disposed at least partially in the forming portion.

In another aspect, provided is a system that transforms plastic parisons into plastic containers, comprising at least one transforming device and a vacuum generating device. The at least one transforming device comprises an application device that applies a gaseous medium to the plastic parisons; a blow mould for producing the plastic containers. The blow mould comprises at least two blow mould parts; a hollow space formed from the at least two blow mould parts at which plastic parisons are transformed by an application of a flowable medium to the plastic containers, the hollow space including an interior wall that has a contour which produces a predetermined configuration of the plastic containers; a first portion of at least two blow mould parts producing a bottom of the plastic containers; and a second portion of the at least two blow mould parts having an opening region for discharging a gaseous medium during an expansion process of the plastic containers, wherein the opening region extends along a first line and a second line. The vacuum generating device which at least intermittently during the expansion process extracts a gaseous medium from the hollow space through the opening region.

In some embodiments, the extraction of the medium is coupled at least intermittently to a further movement which takes place during a transforming process performed by the at least one transforming device.

In some embodiments, the opening region is disposed in a region of the blow mould, which forms a supporting foot of the plastic containers.

In some embodiments, a plurality of holes are disposed in the opening region, and along at least one of the first and second lines.

In another aspect, provided is a base part for a blow mould for producing plastic containers, comprising: an inner wall with a contour which produces a predetermined base configuration of the containers to be produced; and a plurality of opening regions in the base part which are spaced apart from one another and enable discharge of a gaseous medium during an expansion process of the container, wherein the opening regions are disposed at least in some portions in a portion of the base part forming an underside of the container, and wherein the opening regions extend at least in some sections along a first line and a second line, and wherein the first and second lines run at least in some sections at an angle different from 0° relative to one another.

In some embodiments, an opening region of the plurality of opening regions is disposed in a region of the blow mould, which forms a supporting foot of the plastic containers.

In some embodiments, the opening region is constructed and arranged as a slot.

In some embodiments, a plurality of holes are disposed in the opening region, and along at least one of the first and second lines.

In another aspect, provided is a method for transforming plastic parisons, comprising: expanding the plastic parisons by an application of a gaseous medium within a hollow space formed inside a blow mould; and extracting the gaseous medium at least intermittently from a region of the hollow space outside the plastic parison.

In some embodiments, extracting the medium includes the extraction of the medium coupled at least intermittently to a further movement which takes place during transforming of the plastic parisons.

BRIEF DESCRIPTION OF THE FIGURES

The above and other objects and features will become apparent from the following description with reference to the following figures, wherein like reference numerals refer to like parts throughout the various figures unless otherwise specified. In the drawings:

Further advantages and embodiments are apparent from the appended drawings.

In the drawings:

FIG. 1 shows a schematic representation of a system for transforming plastic parisons into plastic containers, in accordance with some embodiments;

FIG. 2 shows a representation of a blow station with blow mould for transforming plastic parisons into plastic containers, in accordance with some embodiments;

FIG. 3 shows a representation of a base part of a blow mould, in accordance with some embodiments;

FIG. 4 shows a representation of the base part shown in Figured 2 and 3, including an interior of the base part;

FIG. 5 shows a representation of a base part of a blow mould, in accordance with other embodiments;

FIG. 6 shows a representation of the base part of FIG. 5 in a further view;

FIG. 7 shows a further representation of a base part, in accordance with some embodiments;

FIG. 8 shows a view of the base part shown in FIG. 7;

FIGS. 9 and 10 show two further views of a base part, in accordance with some embodiments;

FIG. 11 shows a further embodiment of a base part, in accordance with some embodiments;

Figure 12:
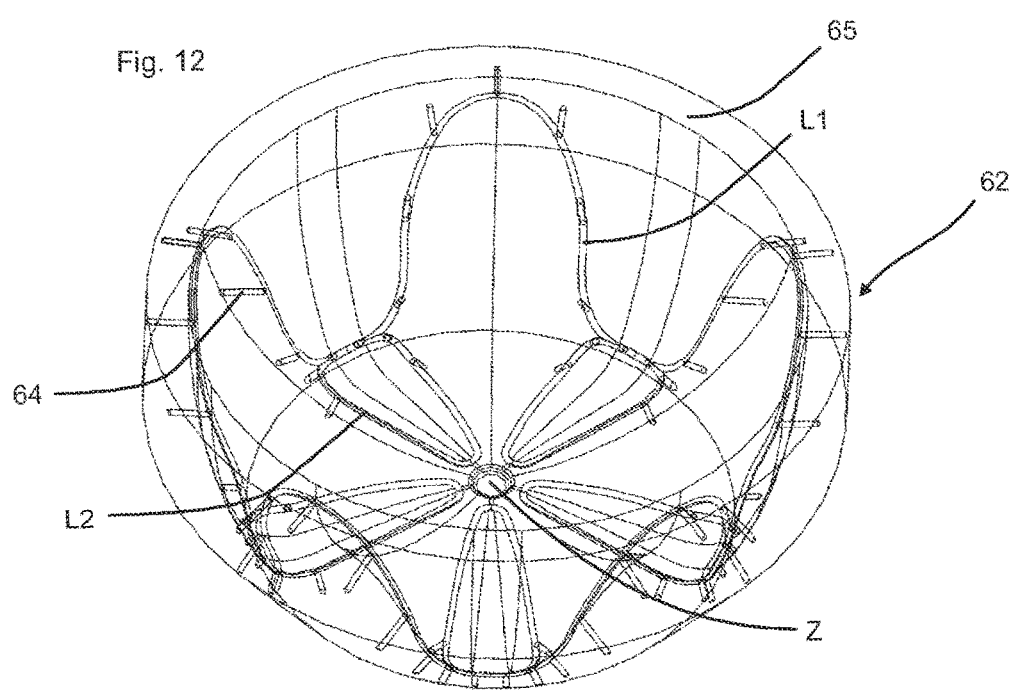
Figure 13:
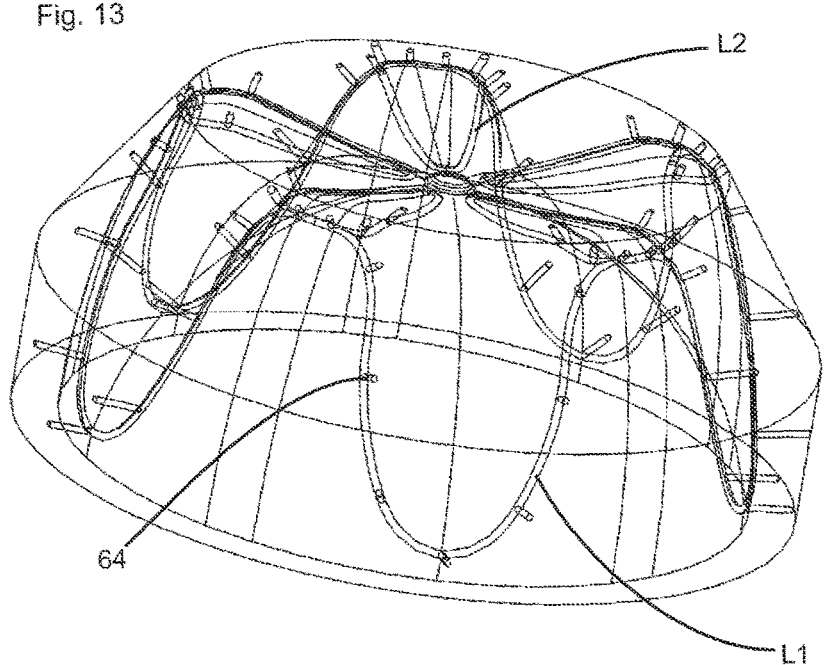
Figure 14:
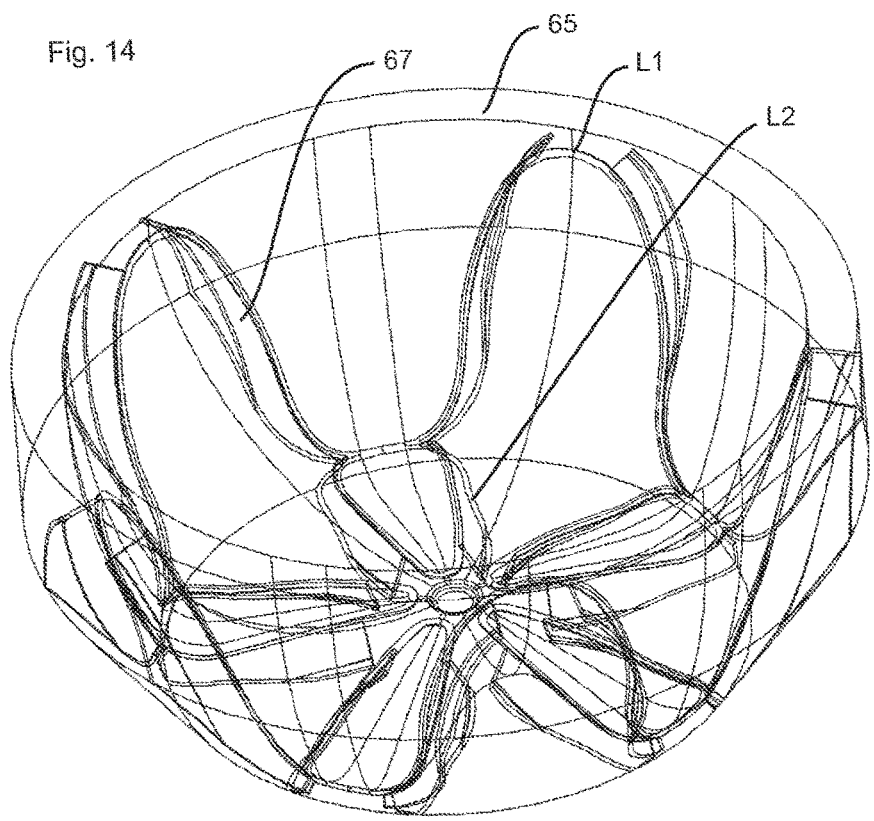
Figure 15:
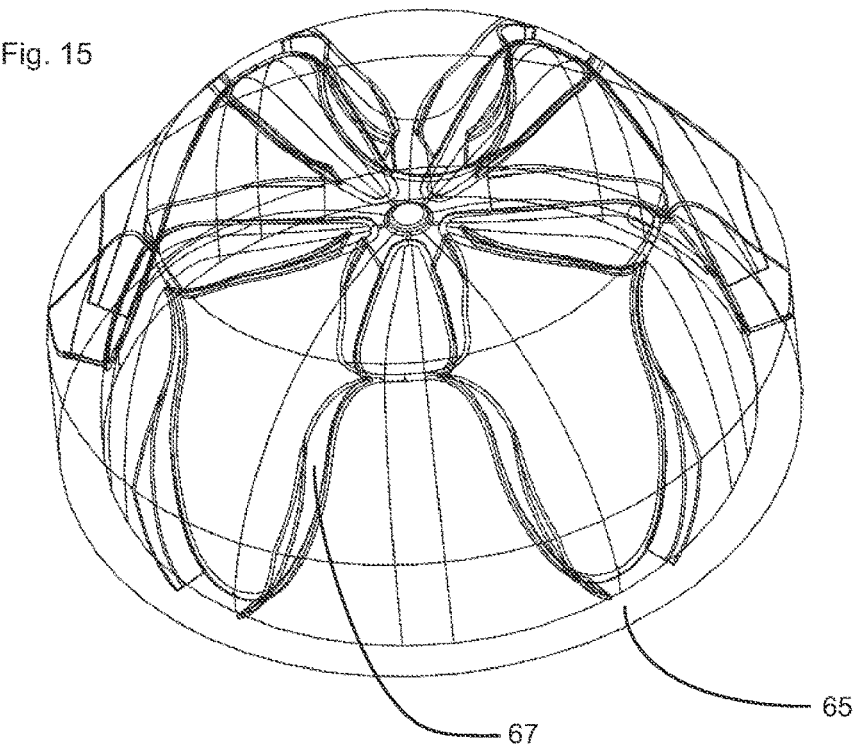
Figure 16:
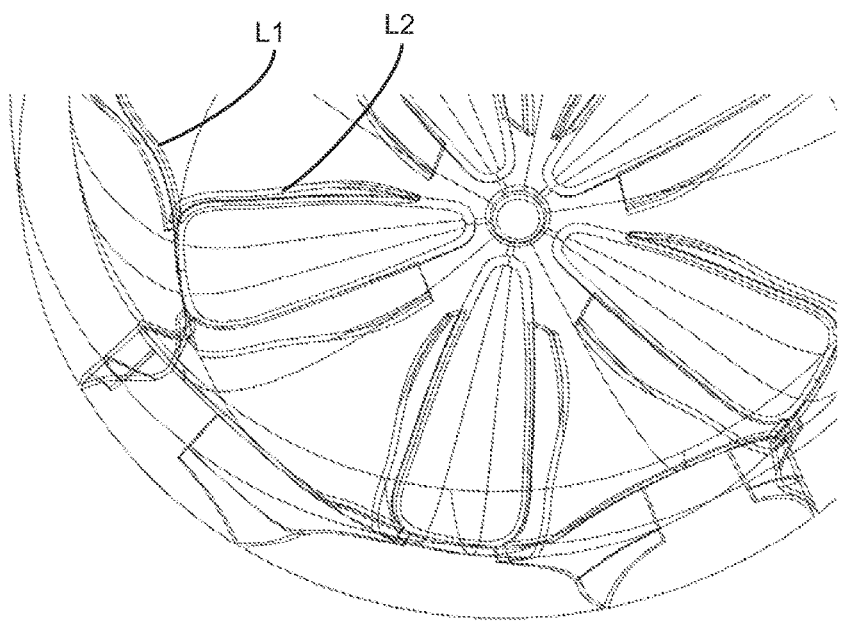
Figure 17:
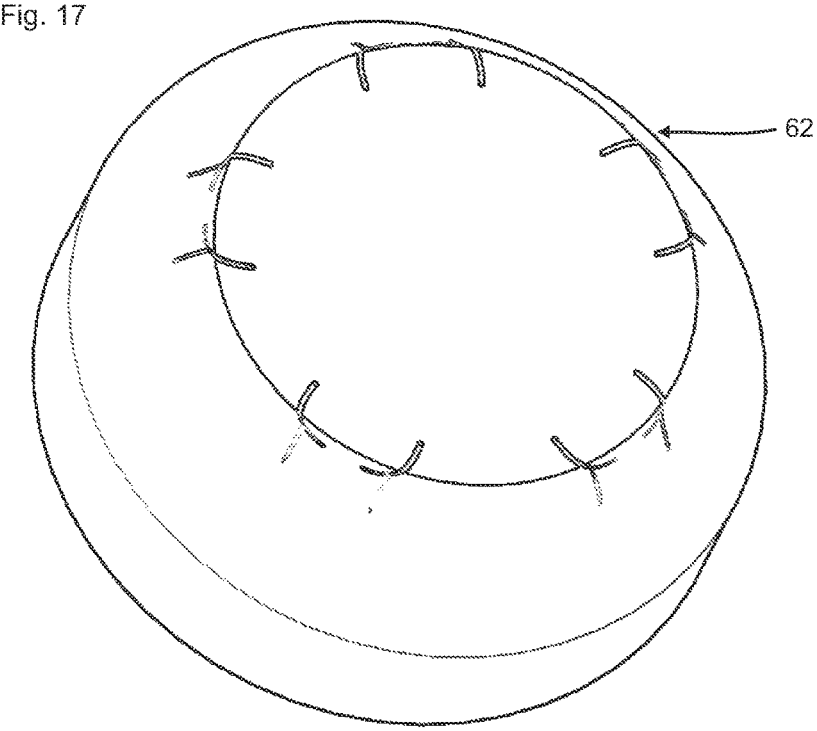
Figure 18:
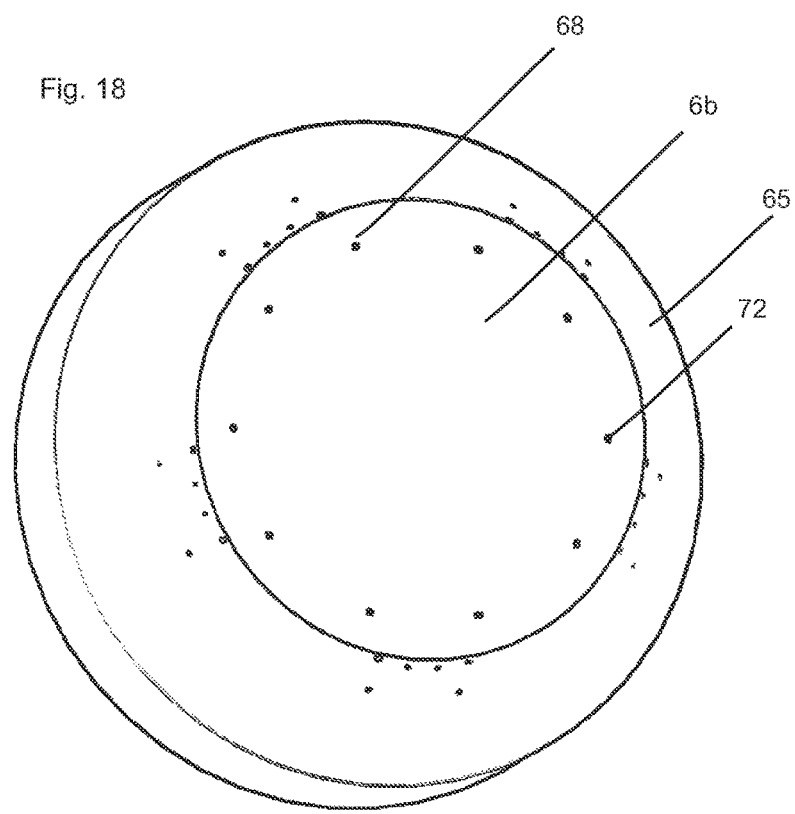

FIGS. 12 and 13 show two representations of a further base part, in accordance with some embodiments FIGS. 14 to 16 show three further representations of a base part, in accordance with some embodiments FIG. 17 shows a view of a base part from a bottom region of the base part, in accordance with some embodiments; and FIG. 18 shows a further view of a base part in a view from a bottom region of the base Part, in accordance with some embodiments.

DETAILED DESCRIPTION

Exemplary embodiments in accordance with principles of inventive concepts will now be described more fully with reference to the accompanying drawings, in which exemplary embodiments are shown. Exemplary embodiments in accordance with principles of inventive concepts may, however, be embodied in many different forms and should not be construed as being limited to the embodiments set forth herein; rather, these embodiments are provided so that this disclosure will be thorough and complete, and will fully convey the concept of exemplary embodiments to those of ordinary skill in the art. In the drawings, the thicknesses of layers and regions may be exaggerated for clarity. Like reference numerals in the drawings denote like elements, and thus their description may not be repeated.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Like numbers indicate like elements throughout. As used herein the term "and/or" includes any and all combinations of one or more of the associated listed items. Other words used to describe the relationship between elements or layers should be interpreted in a like fashion (e.g., "between" versus "directly between," "adjacent" versus "directly adjacent," "on" versus "directly on").

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of exemplary embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of exemplary embodiments. As used herein, the singular forms "a," "an" and "the" are intended to include the plural forms as well, unless the context clearly indicates otherwise. It will be further understood that the terms "comprises", "comprising", "includes" and/or "including," if used herein, specify the presence of stated features, integers, steps, operations, elements and/or components, but do not preclude the presence or addition of one or more other features, integers, steps, operations, elements, components and/or groups thereof.

Exemplary embodiments in accordance with principles of inventive concepts are described herein with reference to cross-sectional illustrations that are schematic illustrations of idealized embodiments (and intermediate structures) of exemplary embodiments. As such, variations from the shapes of the illustrations as a result, for example, of manufacturing techniques and/or tolerances, are to be expected. Thus, exemplary embodiments in accordance with principles of inventive concepts should not be construed as limited to the particular shapes of regions illustrated herein but are to include deviations in shapes that result, for example, from manufacturing. Thus, the regions illustrated in the figures are schematic in nature and their shapes are not intended to illustrate the actual shape of a region of a device and are not intended to limit the scope of exemplary embodiments.

Unless otherwise defined, all terms (including technical and scientific terms) used herein have the same meaning as commonly understood by one of ordinary skill in the art to which exemplary embodiments in accordance with principles of inventive concepts belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

In conventional blow moulding processes, and in particular stretch blow moulding processes, the energy requirement for the application is substantially determined inter alia by the so-called final blow moulding pressure. Final blow moulding pressure refers to the pressure with which the plastic parison is entirely shaped to form a required container. It is desirable to use the lowest possible final blow moulding pressure. As a general rule, the configuration of the last corners of the container, in particular, at the feet of a base cup, is restrictive. In order to ensure that the displaced air flows out of the blow mould, in particular, during the inflation of the containers, according to the internal prior art in the name of the applicant blow moulds have already been provided to some extent with ventilation openings. In conventional configurations, holes are typical placed in every corner of the foot of a floor. Another hole is placed in a flank to a main diameter. However, these openings or holes limit the volumetric flow flowing off in such a way that the lowest possible blowing pressure is prevented.

On the other hand, the choice of respective openings in the blow mould is limited. If such an opening is too large, as a result a part of the plastic of the container can be pushed into this opening, which is then also visible or at least easily perceptible on the resulting container.

An object of the present inventive concepts therefore is to ensure sufficient ventilation during the blow moulding process, but without impairing the visual appearance of the containers produced.

A blow mould according to embodiments of the inventive concepts for producing plastic containers has at least two blow moulds which form a hollow space inside which plastic parisons can be transformed by the application of a flowable medium to the plastic containers. An inner wall of the blow mould parts delimiting this hollow space has a contour which produces a predetermined configuration of the containers to be produced. Furthermore, at least one portion of a blow mould part produces a base or bottom of the plastic container. A portion of the blow mould part at least one opening region is provided which enables discharge of a gaseous medium during an expansion process of the container. This opening region extends at least in some sections along a first line as well as along a second line, wherein these lines run at least in some sections at an angle different from 0° relative to one another.

In contrast to conventional devices, in which only individual holes or a few holes are provided, embodiments of the inventive concepts configure the opening on the one hand in such a way that it allows a larger flow cross-section, but on the other hand not so large that parts of the plastic container can be pushed into these opening regions.

In some embodiments, these lines include at least one angle which is between 10° and 170°. In some embodiments, the lines include at least one angle which is between between 20° and 160°, and in yet other embodiments, between 20° and 80°.

This object can be achieved by the construction of the opening regions in at least two lines which extend in different directions. On the one hand, as could be ascertained in experiments, the flow cross-section can be sufficiently enlarged. On the other hand, the opening regions or the individual openings can be kept so small that the plastic containers are not pushed into them. The arrangement in at least two lines lying parallel to one another offers the possibility of a favourable influence on the development in particular of the feet by ventilation. A plurality of openings for instance can be arranged in predetermined surface sections. Advantageously, at least one line has a length which is greater than 0.5 cm, and preferably greater than 1 cm. Each of the lines preferably preferably has a length of more than 0.5 cm. If for example the opening region is configured as a slot, then the shape of the line results directly from the shape of this slot. If the opening region has a plurality of openings, then the line is a geometric connecting line, which connects these openings to one another.

The lines are advantageously formed in the base contour of the blow mould. The geometric lines can have an intersection point. However, a plurality of lines can also be provided which doe not intersect or touch one another. Two or more lines which are parallel to one another are also conceivable, but not limited thereto. In other embodiments, a bifurcation point is provided in which a line is for example split into two sections so that the second line branches off from this first line.

The ventilation volume is assumed here to be the volume of an entire region to be ventilated, for example, the region of a foot of the container to be produced.

In this case it is possible for the opening to be constructed as a continuous and/or interrupted gap, but the line may also be defined by a plurality of openings which are adjacent to one another. This is explained in greater detail below with reference to the drawings.

In other embodiments, the opening region is disposed in a region of a base part of the blow mould which serves to produce a supporting foot of the container. Petaloid bases known from the prior art usually have a plurality of, for example five or six, such feet which, as mentioned above, are particularly difficult to produce, since here the compressed air produced to some extent prevents a complete expansion. The aforementioned opening regions are preferably disposed in these regions of the blow mould which serve for configuration of these feet.

In another embodiment, the opening region is constructed in the form of a slot. The slot or slots in the base cup can be continuous. The slot-like regions can open into channels which are configured as holes which extend through the wall of the blow mould. Thus the slot-like regions are advantageously constructed in the region of the inner wall of the blow mould, that is to say of the inner wall which produces which the structure of the container.

For example, a first slot can extend along the first line and a second slot can extend along the second line.

In another embodiment, a plurality of holes are disposed in the opening region. These holes are disposed along at least one of the two lines.

A plurality of opening regions are advantageously connected to one another by channels along the line.

The opening region can be disposed as a groove-like construction in the base part or in the blow mould. Ventilation holes can be provided at least at the ends of the grooves and possibly also at an intersection point at which the two lines merge into one another. Channels or grooves can extend between the individual ventilation openings or bores.

In another embodiment, at least one gap or hole has a diameter or a width which is between 0.5 mm and 4 mm. In another embodiment, at least one gap or hole has a diameter or a width which is between 0.5 mm and 2 mm. In another embodiment, at least one gap or hole has a diameter or a width which is approximately 1 mm. It could be ascertained that such diameters or gap widths on the one hand enable a sufficient flow cross-section, but on the other hand effectively prevent a penetration of plastic material during the expansion process.

In addition, specific regions of the base part porous materials can be employed which provide a plurality of small openings through which the gaseous medium can exit.

By employing a procedure in accordance with some embodiments, for example, described herein, a final blow moulding pressure of the containers can be reduced overall by up to 5 bars. Accordingly, the energy costs of the machines and also the necessary compressor size and thus also the costs can be lowered. In addition, in individual cases a simplification of the mechanical engineering is also possible, wherein for example recycling of air can be omitted. In addition the loading of the individual components of corresponding blow stations is also reduced.

In another embodiment, a space between two holes disposed adjacent to one another along the line is less than 4 mm. In another embodiment, a space between two holes disposed adjacent to one another along the line is less than 3 mm. In another embodiment, a space between two holes disposed adjacent to one another along the line is less than 2 mm. At least three, preferably at least four and preferably at least five openings are disposed along each line. Thus the lines are also determined by the position of these openings.

In another embodiment, channels which serve to discharge the gaseous medium adjoin the opening regions inside a wall of the blow mould parts. In this case, the flow paths from, for example, circular holes, can be brought together in a plurality of channels. The channels extend at least partially through the wall of the base part. The channels preferably constitute a flow connection between an external wall of the base part and an inner wall of the base part and thus also between an internal space of the blow mould and an external space of the blow mould.

In another embodiment, the channels extend at least in some sections along a surface normal to the contour, i.e., the inner wall of the blow mould part which delimits the hollow space. In this way, it is possible in the context of the blow moulding process to discharge the air very efficiently or quickly. For example, ventilation holes with a large drilling and a comparatively short throttle length (preferably less than 4 mm, preferably less than 3 mm, preferably less than 2 mm) are provided. A region between the blow mould or the inner wall thereof and a drilling extending from outside or from an outer wall of the blow mould can serve as a throttle.

In some embodiments, the opening regions lie in curved portions of the respective blow mould part.

In another embodiment, the opening regions or the ventilation regions, which may for example are constructed as a hole or gap or the like, are located outside an actual contact surface of a filled container with a geometric planar surface which is perpendicular to the longitudinal axis of the container. In this embodiment, the opening or ventilation regions are located outside for example a base surface of such a container or the portions of the blow mould part which form the base surface.

In another embodiment, the blow mould part has a forming portion for forming a base surface of the container and the opening region is disposed at least partially in this forming portion. Usually these forming portions are the lowest regions of the respective blow mould when an upright container is viewed. Ventilation in this region is therefore very sensible, since the expansion of materials into these regions can be favoured especially. An arrangement of the opening region in this forming portion is also understood if the opening regions approach this region forming the base surface in a range of ±10 mm. In other embodiments, the range is ±8 mm. In other embodiments, the range is ±5 mm, In other embodiments, the range is ±2 mm.

In another embodiment, the openings are also suitable conversely in order in a cleaning or sterilising mode to deliver a cleaning and/or sterilising medium to the blow mould or the hollow space the blow mould.

Other aspects of the present inventive concepts are directed to a system for transforming plastic parisons into plastic containers which has at least one transforming device which in turn has an application device in order to apply a gaseous medium to the plastic parisons, as well as blow mould for producing plastic containers with at least two blow mould parts which form a hollow space inside which plastic parisons can be transformed by the application of a flowable medium to the plastic containers. An inner wall of the blow mould parts delimiting the hollow space has a contour which produces a predetermined configuration of the containers to be produced. At least one portion of a blow mould part produces a base or bottom of the plastic container. In this portion of the blow mould part at least one opening region is provided which enables discharge of a gaseous medium during an expansion process of the container.

According to some embodiments, the system has a vacuum generating device which at least intermittently during the expansion process extracts a gaseous medium from the hollow space through the opening region.

Therefore, the formation of the plastic containers can be additionally favoured in that during the expansion process the gaseous medium is released and preferably extracted through the opening region. Accordingly, the shaping of the container can also take place at lower blowing pressures.

The system preferably has a plurality of such transforming stations.

The extraction of the medium is preferably coupled at least intermittently to a further movement which takes place during the transforming process. A further movement which is used for the transformation of the containers is coupled to the extraction. Such a coupling can take place mechanically and/or by control engineering.

This movement can be selected from a group of movements which includes a stretching rod movement, a rotation of a blow wheel on which the transforming device is arranged, a movement of the base part and the like. Thus, for example, it may be specified that an extraction of the gaseous medium also begins simultaneously with a defined movement of the stretching rod. This extraction can also begin at a specific predetermined position or rotative position of the respective transforming device. Thus, processes which take place during the blow moulding can also be used as triggers for the extraction.

Therefore, the system preferably has a control device which controls an extraction of the gaseous medium in accordance with a further process which is characteristic for the blow moulding process. Thus, an extraction can be started for example at a specific time during the expansion process and can preferably be ended at a predetermined time. In this way a saving of energy is possible, since extraction does not have to take place continuously but only at predetermined time intervals. An extraction volume can be changed during the expansion process.

In another embodiment, the system has a movable, for example, rotatable, carrier on which a plurality of transforming stations is disposed. In another embodiment, the system or the individual transforming stations each have rod-like bodies which can be introduced into the plastic containers in order to expand these containers in the longitudinal direction. These rod-like bodies can be referred to as stretching rods.

The application device can include a blow moulding nozzle which can be set on a mouth region of the plastic parisons in order to apply the gaseous medium and in particular blown air to the plastic parisons in order to expand them.

Aspects of the present inventive concepts are directed to a base part for a blow mould for producing plastic containers. The base part has an inner wall with a contour which produces a predetermined base configuration of the containers to be produced. In the base part a plurality of opening regions are provided which are spaced apart from one another and which enable discharge of a gaseous medium during an expansion process of the container.

The opening regions can be disposed at least in some sections in a portion of the base part which produces an underside of the base part. The opening regions can extend at least in some sections along a first line as well as along a second line. These lines run at least in some sections at an angle different from 0° relative to one another. These opening regions, as stated above, may be formed by slots extending along the lines and/or by openings disposed along the lines. The opening regions are preferably disposed in a curved region of the base part and particularly preferably in a region of the base part which is intended for formation of a supporting foot the container to be formed. The lines can include at least one angle which is between 10° and 170°. In some embodiments, the angle is between 20° and 160°. In some embodiments, the range is between 20° and 80°.

Other aspects of the present inventive concepts are directed to a method for transforming plastic parisons, wherein the plastic parisons are expanded by application of a gaseous medium within a hollow spaced formed inside a blow mould.

A gaseous medium can be extracted at least intermittently from a region of the hollow space in the blow mould outside the plastic parison. The gaseous medium is advantageously extracted at least intermittently during the expansion process of the plastic parison. This space is a space which is located within the hollow space formed by the blow mould but outside the plastic parison. The gaseous medium is advantageously extracted from a base region of the blow mould. This extraction of the gaseous medium advantageously takes place in particular for formation of supporting regions of the plastic container.

In accordance with some embodiments, a method the extraction of the medium is preferably coupled at least intermittently to a further movement which takes place during the transforming process.

Figure 1:
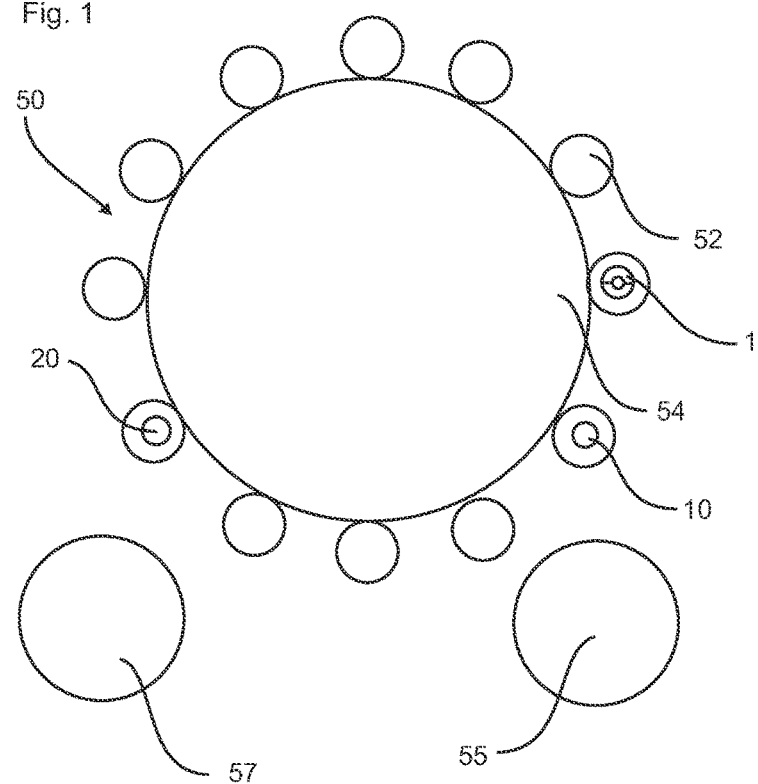

FIG. 1 shows a schematic representation of a system 50 for transforming plastic parisons 10 into plastic containers 20, in accordance with some embodiments.

As shown in FIG. 1, the plastic parisons 10 are delivered by a delivery device 55, such as for instance a delivery star. The finished plastic containers 20 are removed from the system 50 by a discharge star 57 or related discharge unit. The system further includes a transforming device 50. The transforming device 50 has a rotatable carrier 54 on which a plurality of transforming stations 52 are disposed. Each transforming station 52 can have a blow mould 1.

Figure 2:
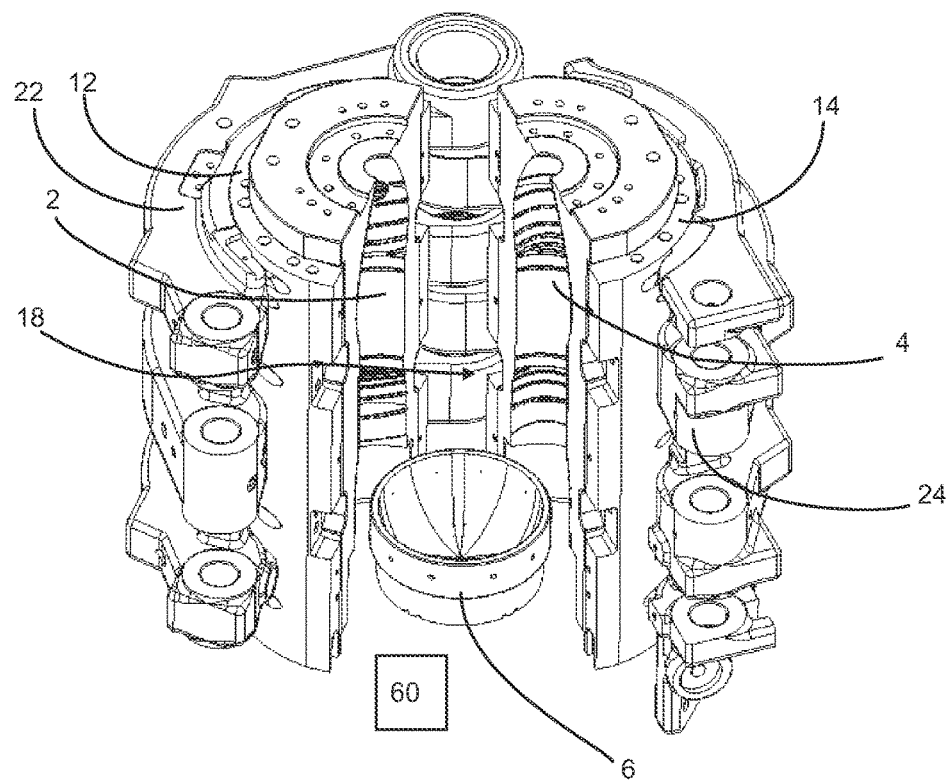

FIG. 2 shows a schematic view of a blow mould, for example, blow mould 1 of FIG. 1, according to some embodiments of the present inventive concepts. This blow mould has two side parts 2, 4 as well as a base part 6. The side parts 2, 4, and the base part 6 collectively form a hollow space 18 in the blow mould within which a plastic parison 10 can be expanded to form a plastic container 20. Ventilation openings described herein are located in particular in the base part 6, but they can also be provided in the side parts 2, 4, for example in order to be better able to form complicated curvatures of the plastic container 20. Support shells 12, 14 support the blow mould parts 2, 4. The blow mould parts can be fastened to blow mould supports 22, 24, respectively, for example, by the support shells 12, 14.

A vacuum generating device 60 is only shown schematically. The vacuum generating device 60 can be controlled so that during a predetermined time period during the expansion of the plastic parisons it draws air out of the interior of the blow mould 1.

FIGS. 3 to 18 illustrate various embodiments of base parts. For greater clarity not all of the reference signs are shown in the individual drawings.

Figure 3:
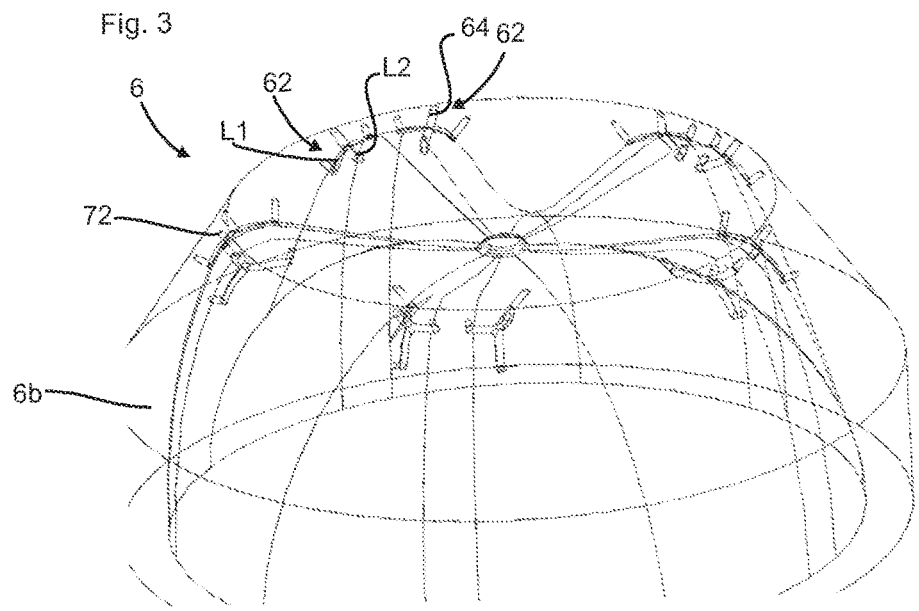

FIG. 3 shows a representation of a base part 6 of a blow mould 1, in accordance with some embodiments. In particular, FIG. 3 shows a representation of a base part 6 from a bottom view.

As shown in FIG. 3, the base part 6 includes opening regions 62, which here in each case have a channel facing the plastic containers 20 during operation and extending along lines L1 and L2, as well as connecting channels 64 which lead to openings 72 disposed on the external surface 6b of the base part. Two opening regions 62 are associated with each supporting leg to be formed. The opening regions 62 extend along two lines L1 and L2, wherein these two lines are not parallel to one another and also intersect in an intersection point. A gaseous medium can be discharged or drawn off by this arrangement in a particularly favourable manner.

Figure 4:
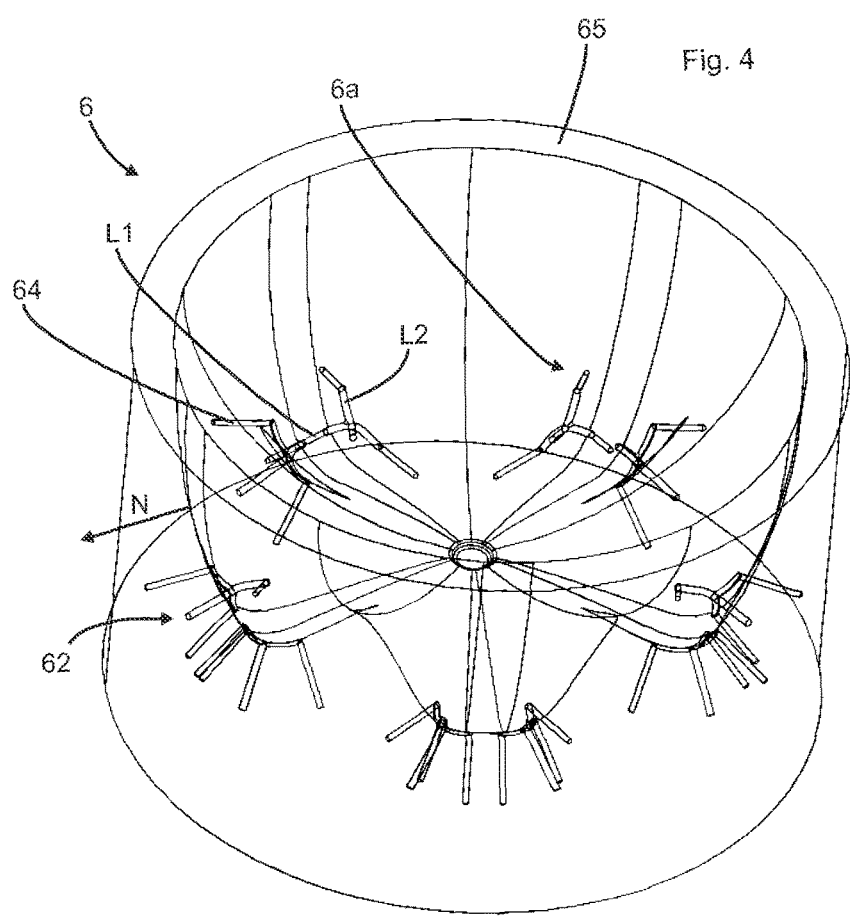

FIG. 4 shows another view of the base part 6 shown in FIGS. 2 and 3. The individual opening regions 62 are each disposed in the regions of the base part 6 which serve to distinguish supporting feet of a plastic container to be produced. Individual connecting channels extend through the wall 65 of the base part, extending in the direction of a surface normal N, or perpendicular, to the inner wall of the base part 6. Accordingly, angled portions can be omitted in the discharge of air.

If because of the position of the opening 72 (cf. FIG. 3) the direction of the surface normal N is not possible (for the angle of attack of the tool), the direction of the surface normal can be replaced by an axis in the direction of the angle of attack between 0° and 90°, wherein angle 0° corresponds to a vertical axis extending from a center.

A portion 6a of the base region 6 in which said openings or opening regions are disposed can serve for the construction of supporting feet for plastic containers to be produced.

Figure 5:
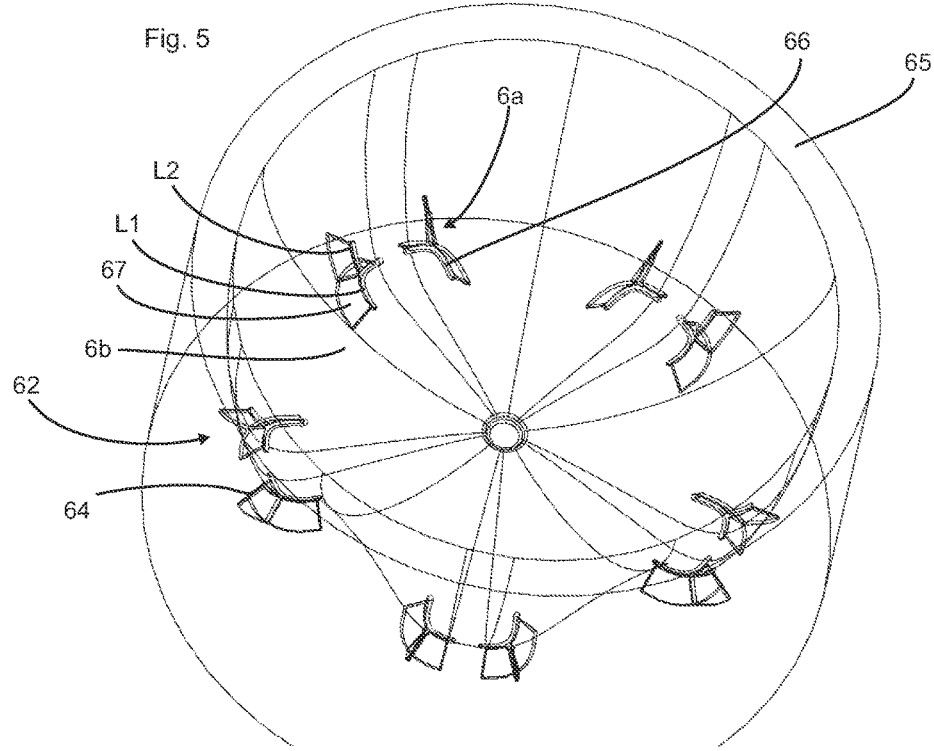

FIG. 5 shows a representation of a base part 6, in accordance with other embodiments.

In FIG. 5, channels 66 are provided on the surface facing the plastic parison. The channels 66 are constructed here as continuous slots 67 which extend through the wall 65 of the base part. Air can be discharged through these slots. However, the channels are constructed on the inner wall. The slots 67 can extend in two different directions L1 and L2.

Figure 6:
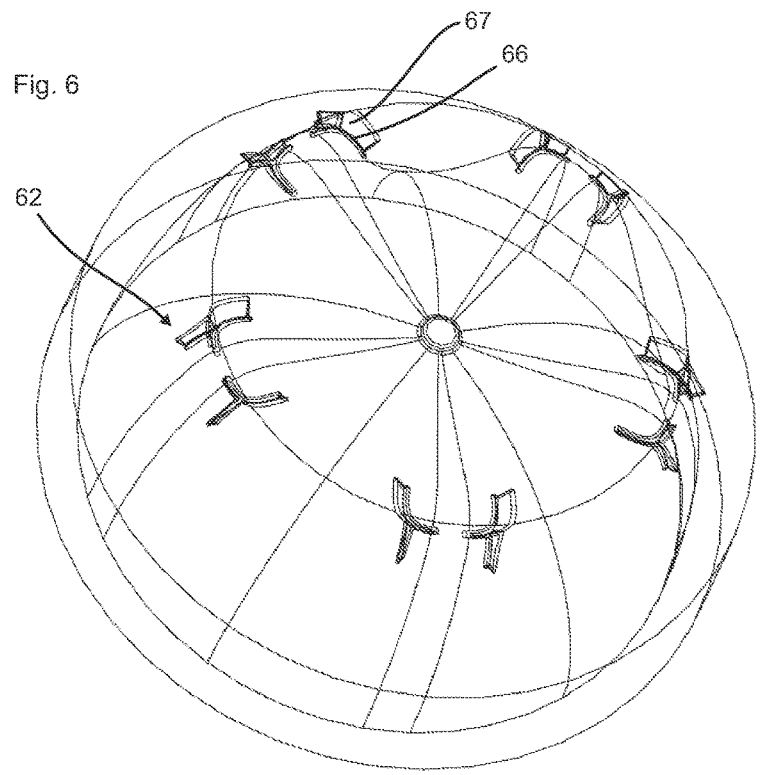

FIG. 6 shows a further view of the base part 6 shown in FIG. 5.

In the embodiment shown in FIG. 6 a total of ten opening regions 62 are provided. Two opening regions 62 are associated with a supporting foot which is to be constructed for the container to be produced.

FIGS. 7 and 8 show a base part 6, in accordance with some embodiments. Channels 66 are provided as well as connecting channels 64, which extend through the wall 65 of the base part 6 are again provided on the inner wall of the blow mould 1. In this embodiment the opening regions 62 are constructed and arranged similar to a crow's foot and therefore also again have two lines L1 and L2 which are not parallel to one another. Further lines, such as L3, can also be provided which likewise do not run parallel to the two other lines L1, L2. The representation shown in FIG. 7 or a corresponding base part is likewise suitable in a particularly favourable manner for discharging or drawing off air from those regions which are intended at a later stage to produce the supporting feet.

FIG. 8 shows a further representation which again clearly shows that the opening regions 62 are disposed in those portions 63 of the base part 6, which form the supporting feet.

FIGS. 9 and 10 show a base part 6, in accordance with other embodiments. Here too the channels are formed similar to a crow's foot on the inner wall of the base part 6. However, the channels 66 are not adjoined by individual channels but by slots 67 or related openings which extend through the wall 65 of the base part. On the inner face of the base part 6, the slots 67 or openings are preferably adapted to the contour of the plastic container being formed.

Figure 11:
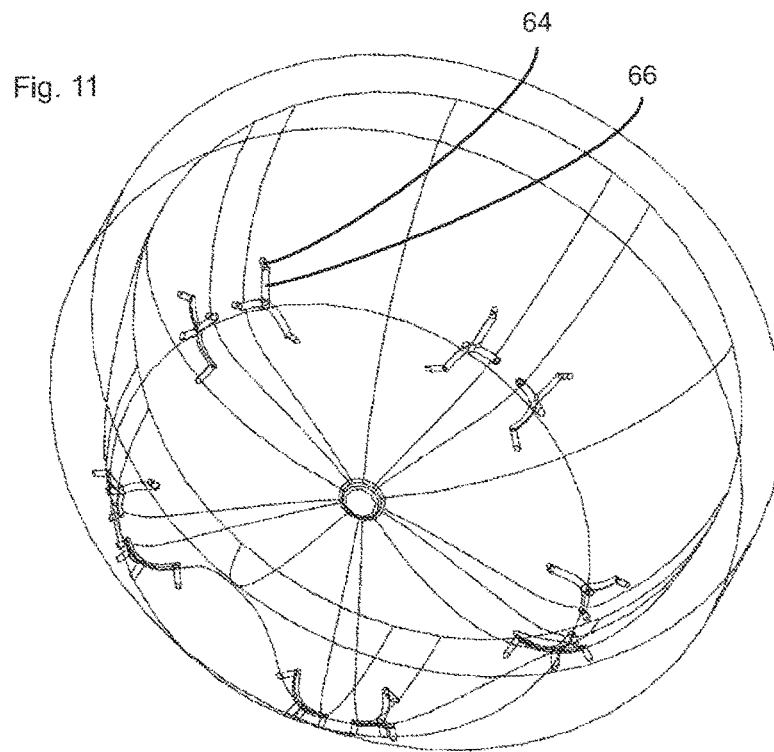

FIG. 11 in turn shows a representation with channels 66 and adjoining connecting conduits 64. However, the structure can be reversed, namely, a plurality of openings which are disposed on the inner wall 85 of the base part 6 and in each case have channels which lead to the external wall of the base part 6. Similar to other embodiments mentioned above, the openings are disposed along the respective lines L1 and L2.

FIGS. 12 and 13 show another embodiment. A first line L1 is provided here which extends in an undulating manner about the base part 6. The second line L2 here is a closed line, through which there is direct arrangement on the base, and which extends towards a central region Z of the base part 6. At least a portion of the second line L1 can abut can the first line L1. Here too a plurality of connecting channels 64 extend through the wall 65 of the base part 6.

FIG. 13 shows a further representation of the base part shown in FIG. 12. Here too the two lines L1 and L2 are discernible as well as also the connecting channels 64.

FIG. 14 shows a base part, according to other embodiments of the inventive concepts. Here, too, lines L1 and L2 are discernible, but again no connecting channels 64 are provided here. The outward connection is again in the form of a slot 67 in the wall 65 of the base part.

FIG. 15 shows a further representation of the base part shown in FIG. 14. This shows the two lines L1 and L2 as well as the slots 67 which extend through the wall 65 of the base part.

FIG. 16 shows a further representation of the base part shown in FIGS. 15 and 14, wherein here again regions which form the respective lines L1 and L2 are discernible.

FIG. 17 shows a view of a base part illustrated from a bottom region. The opening regions are shown here. In this case slots in the base parts arein each case disposed in the wall 65.

In the embodiment shown in FIG. 18, there are no slots provided in the wall 65. Instead, the channels 64 shown in some of the preceding drawings which each lead to a plurality of openings 72.

The applicant reserves the right to claim all the features disclosed in the application documents as essential to the invention in so far as they are individually or in combination novel over the prior art.

What is claimed is:

1. A blow mould for producing plastic containers, comprising:
   at least two blow mould parts;
   a hollow space formed from the at least two blow mould parts at which plastic parisons are transformed by an application of a flowable medium to the plastic containers, the hollow space including an interior wall that has a contour which produces a predetermined configuration of the plastic containers;
   a first portion of at least two blow mould parts producing a bottom of the plastic containers; and
   a second portion of the at least two blow mould parts having an opening region for discharging a gaseous medium during an expansion process of the plastic containers, wherein the opening region extends along a first line and a second line, wherein the first and second lines run at least in some sections of the blow mould at an angle different from 0° relative to one another, wherein the opening region is configured as a slot, and wherein a shape of a line of the first and second lines results directly from the shape of the slot, wherein the blow mould further comprises at least one gap has a width between 0.5 mm and 2 mm, or approximately 1 mm.

2. The blow mould of claim 1, wherein the opening region is disposed in a region of the blow mould, which forms a supporting foot of the plastic containers.

3. The blow mould of claim 1, wherein the opening region is constructed and arranged as a slot.

4. The blow mould of claim 1, wherein a plurality of holes are disposed in the opening region, and along at least one of the first and second lines.

5. The blow mould of claim 4, wherein at least one hole of the plurality of holes has a diameter between 0.5 mm and 4 mm.

6. The blow mould of claim 5, wherein at least one hole of the plurality of holes has a diameter between 0.5 mm and 2 mm.

7. The blow mould of claim 4, wherein a spacing between two adjacent holes along at least one of the first and second lines is less than 2 mm.

8. The blow mould of claim 1, wherein the at least two blow mould parts further comprise a wall and a plurality of channels which discharge the gaseous medium, and adjoin the opening regions at the wall.

9. The blow mould of claim 8, wherein the channels extend at least in some sections along a surface normal to a contour of the hollow space.

10. The blow mould of claim 9, wherein a blow mould part of the at least two blow mould parts has a forming portion for forming a base surface of the plastic containers, and wherein the opening region is disposed at least partially in the forming portion.

11. A system that transforms plastic parisons into plastic containers, comprising:
    at least one transforming device, comprising:
      an application device that applies a gaseous medium to the plastic parisons;
      a blow mould for producing the plastic containers, the blow mould comprising:
        at least two blow mould parts;

a hollow space formed from the at least two blow mould parts at which plastic parisons are transformed by an application of a flowable medium to the plastic containers, the hollow space including an interior wall that has a contour which produces a predetermined configuration of the plastic containers;

a first portion of at least two blow mould parts producing a bottom of the plastic containers; and a second portion of the at least two blow mould parts having an opening region for discharging a gaseous medium during an expansion process of the plastic containers, wherein the opening region extends along a first line and a second line, wherein the opening region is configured as a slot, and wherein a shape of a line of the first and second lines results directly from the shape of the slot, the blow mould further comprising at least one gap of the slot having a width that is between 0.5 mm and 2 mm, or approximately 1 mm; and a vacuum generating device which at least intermittently during the expansion process extracts a gaseous medium from the hollow space through the opening region.

12. The system of claim 11, wherein the extraction of the medium is coupled at least intermittently to a further movement which takes place during a transforming process performed by the at least one transforming device.

13. The system of claim 11, wherein the opening region is disposed in a region of the blow mould, which forms a supporting foot of the plastic containers.

14. The system of claim 11, wherein a plurality of holes are disposed in the opening region, and along at least one of the first and second lines.

15. A base part for a blow mould for producing plastic containers, comprising:

an inner wall with a contour which produces a predetermined base configuration of the containers to be produced; and a plurality of opening regions in the base part which are spaced apart from one another and enable discharge of a gaseous medium during an expansion process of the container, wherein the opening regions are disposed at least in some portions in a portion of the base part forming an underside of the container, and wherein the opening regions extend at least in some sections along a first line and a second line, wherein the first and second lines run at least in some sections at an angle different from 0° relative to one another, wherein an opening region of the opening regions is configured as a slot and includes at least one gap of the slot having a width that is between 0.5 mm and 2 mm, or approximately 1 mm, and wherein a shape of a line of the first and second lines results directly from the shape of the slot.

16. The base part of claim 15, wherein the opening region of the pluraltiy of opening regions is disposed in a region of the blow mould, which forms a supporting foot of the plastic containers.

17. The blow mould base part of claim 16, wherein a plurality of holes are disposed in the opening region, and along at least one of the first and second lines.

18. The blow mould of claim 1, wherein the opening region is disposed as a groove-line construction in the base part and ventilation holes are provided at least at ends of the grooves and at an intersection point at which the two lines merge with each other.

19. A blow mould for producing plastic containers, comprising:

at least two blow mould parts;

a hollow space formed from the at least two blow mould parts at which plastic parisons are transformed by an application of a flowable medium to the plastic containers, the hollow space including an interior wall that has a contour which produces a predetermined configuration of the plastic containers;

a first portion of at least two blow mould parts producing a bottom of the plastic containers; and a second portion of the at least two blow mould parts having an opening region for discharging a gaseous medium during an expansion process of the plastic containers, wherein the opening region extends along a first line and a second line, wherein the first and second lines run at least in some sections of the blow mould at an angle different from 0° relative to one another, wherein the opening region is configured as a slot, and wherein a shape of a line of the first and second lines results directly from the shape of the slot, wherein the opening region is disposed as a groove-line construction in the base part and ventilation holes are provided at least at ends of the grooves and at an intersection point at which the two lines merge with each other.

20. The blow mould of claim 1, wherein the first portion and the second portion are both part of or form the bottom of the plastic containers.

* * * * *